(No Model.) 3 Sheets—Sheet 2.

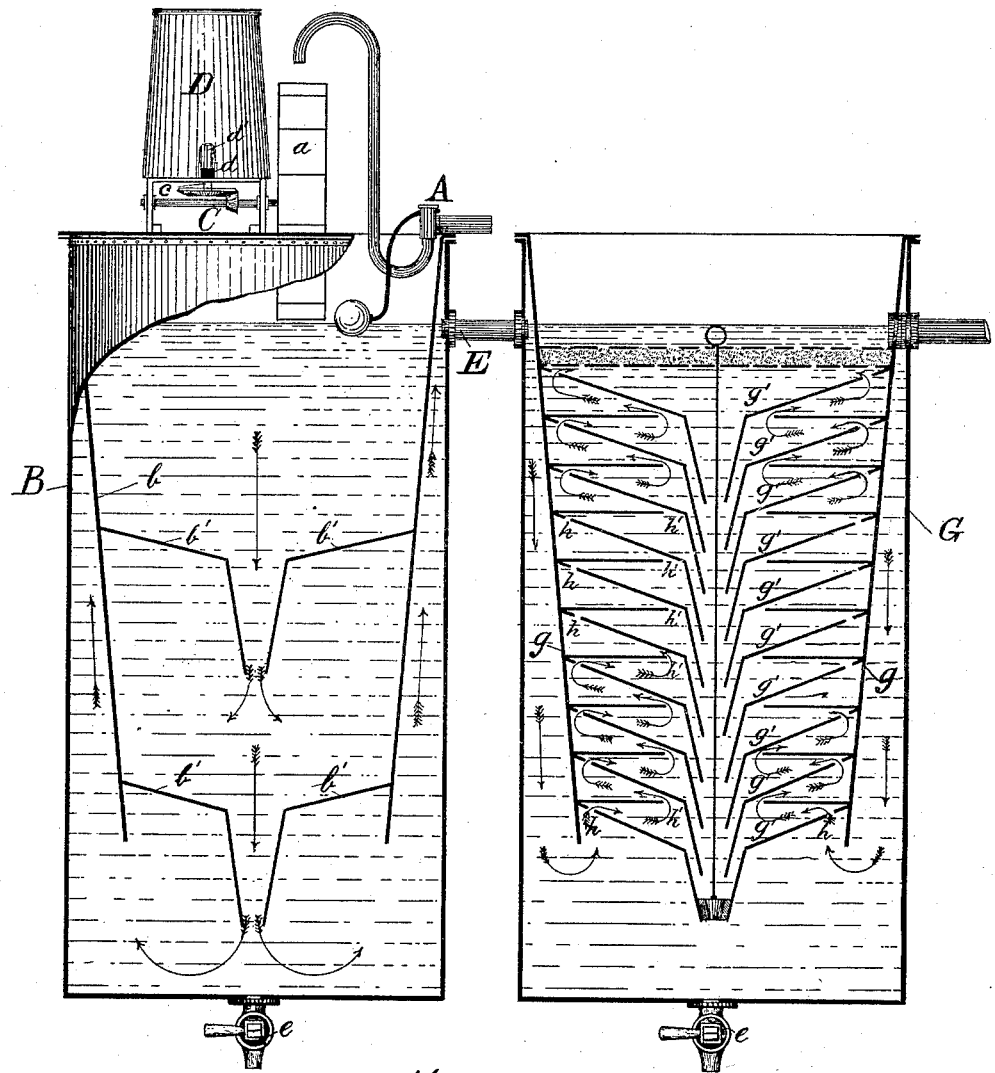

P. A. MAIGNEN.
FILTER.

No. 460,378. Patented Sept. 29, 1891.

Witnesses:
H de Vos.
E. L. Richards

Inventor:
Prosper Auguste Maignen.
By Richards
Attorneys.

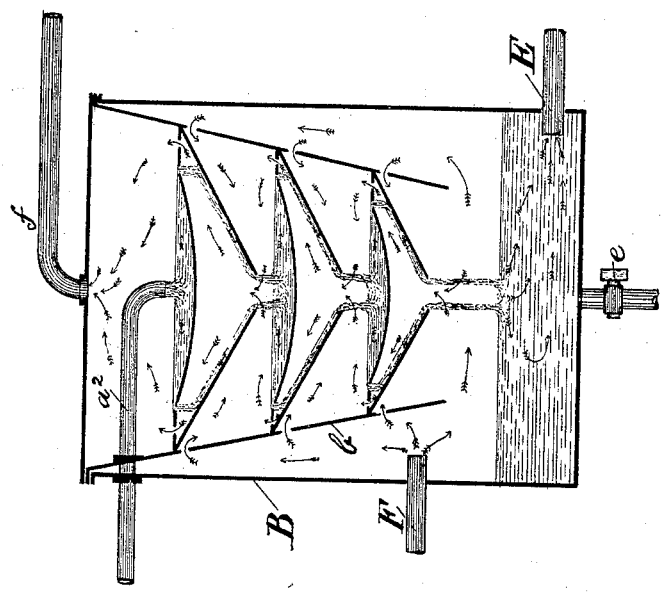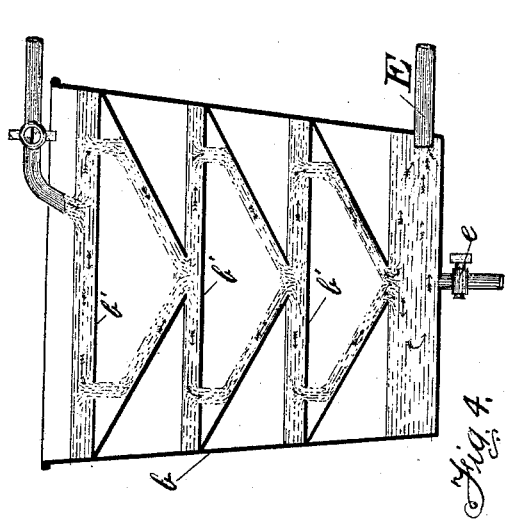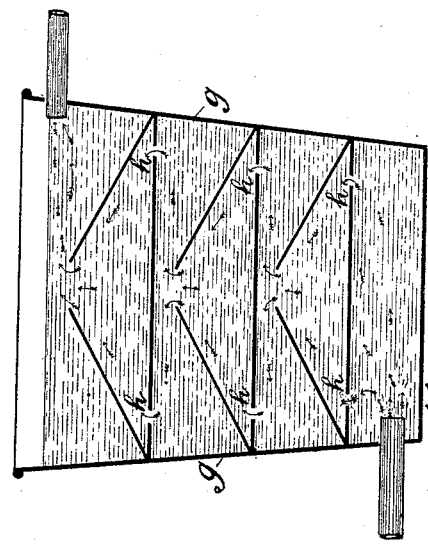

UNITED STATES PATENT OFFICE.

PROSPER AUGUSTE MAIGNEN, OF LONDON, ENGLAND.

FILTER.

SPECIFICATION forming part of Letters Patent No. 460,378, dated September 29, 1891.

Application filed June 4, 1889. Serial No. 313,067. (No model.) Patented in England June 9, 1884, No. 8,745, and March 28, 1888, No. 4,760, and in France December 24, 1888, No. 194,997.

*To all whom it may concern:*

Be it known that I, PROSPER AUGUSTE MAIGNEN, a citizen of France, residing at London, England, have invented Apparatus for Treating and Purifying Water or other Liquids, (patented in Great Britain and Ireland under No. 4,760, dated March 28, 1888, and No. 8,745, dated June 9, 1884, and in France, No. 194,997, dated December 24, 1888,) of which the following is a specification.

My invention relates to apparatus for the treatment or purification of water or other liquids, and is designed by a series of automatic operations to treat the liquids with a proportional foreign substance and afterward to separate the solid matter from the liquids in which it may be suspended.

Figure 3:
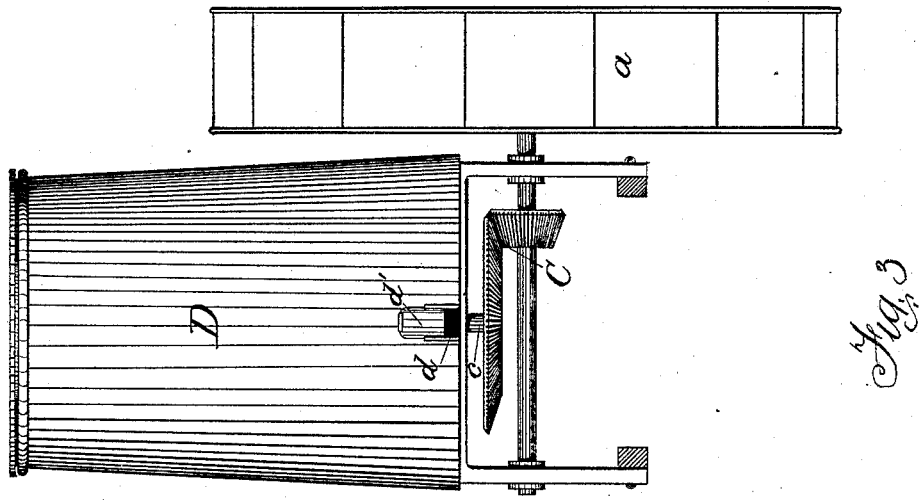
Figure 2:
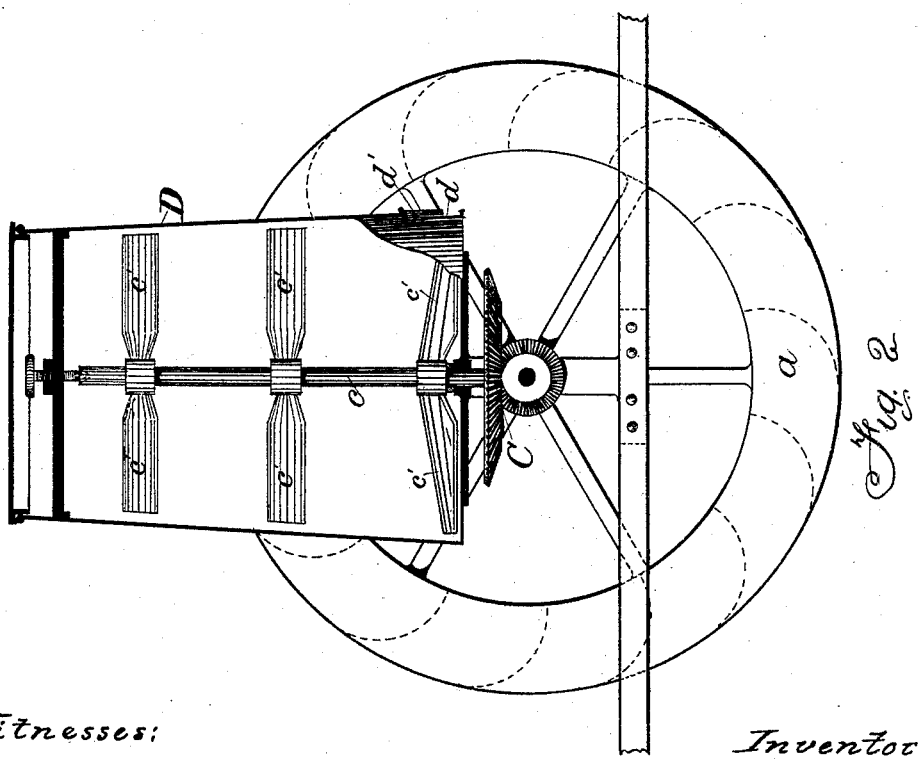

Figure 1 is a sectional view of my complete apparatus. Figs. 2 and 3 are sectional end and side views, respectively, of the automatic device by which the foreign substance, such as a powder, is automatically fed into the liquid proportionately to the flow of the latter. Figs. 4 and 5 are sectional elevations of equivalent modifications of the agitating devices shown in Fig. 1. Fig. 6 is a sectional elevation of an equivalent modification of the separator as shown in Fig. 1.

To carry my invention into practice, I cause the flow of the liquid to be treated to pass through a ball-cock A into the first agitating-vessel B, and cause the said flow of liquid to pass by a suitable pipe over an overshot or other water-wheel $a$. This wheel $a$, Figs. 2 and 3, by its rotation operates bevel-gearing C, by which the vertical shaft $c$, with agitating-arms $c'$, is rotated within the can or vessel D, which contains the foreign substance for treating the water or other liquid. This foreign substance may be either a softening-powder, as already patented to me, No. 355,773, for softening hard water, or may be any other convenient material to produce a desired effect upon any other liquid. The rotation of the shaft $c$ and beaters $c'$ causes the powder within the can to be discharged through the orifice $d$, which is provided with a regulating-shutter $d'$. This apparatus provides an automatic feed of a foreign substance discharged into the liquid to be treated proportionally to the flow of the liquid over the water-wheel $a$. The liquid, with the foreign substance mixed with it, passes through the first vessel B, which is so arranged as to produce an increasing current in the liquid treated and its agitation by passing through successively-contracted orifices impinging also upon successively opposing plates, cones, or divisions, so that thorough agitation is secured. To effect this, a coned chamber $b$ is hung suspended within the vessel B, and within the said coned chamber $b$ a succession of diaphragms or plates or inverted cones $b'$, with contracted nozzles or orifices, are suspended to produce the necessary agitation in the liquid. The coned chamber $b$ may be used alone without the outer vessel B, as shown in Fig. 4, and the diaphragms or plates $b'$ may consist of flat diaphragms with apertures pierced therein and cones projecting on the under side, as shown in Fig. 4, equivalently with the plain-coned diaphragms $b'$, as shown in Fig. 1. When the coned chamber $b$ is used with the surrounding vessel B, duplicate travel of the liquid is obtained in a single vessel, the liquid after agitation rising quietly into the space between the outer vessel and the inner chamber $b$ till it issues at the orifice E. The bottom of these respective cases or vessels may be cleansed or flushed when desirable by the cock $e$. The combination of the internally-coned chamber $b$ and the external vessel B may be utilized to effect treatment by heat or gases of the liquid introduced through the pipe $a^2$, Fig. 5, the vessel being closed on the top. The heated or other gases may enter through the pipe F or be equivalently introduced in any convenient manner. They would then have access to the descending and agitated fluid in a state of fine subdivision through perforations or openings, or in any other convenient way, through the sides of the supporting coned chamber $b$, and would be free to pass out by the pipe $f$, the vessel being closed by a cover. The downward current of the fluid may form a sufficient induction-draft to draw gases or heat through the said apertures into the interior of the chambers, or artificial draft may be induced by fans or other suitable means. The liquid so treated may pass by the orifice and pipe E to the adjoining vessel G, which contains within it another coned hanging chamber $g$, and within such coned chamber are a series of conical diaphragms with nozzles and covering-plates $g'$. This vessel is so constructed that the greatest possible inducement is offered for the deposition of the suspended particles. This is done by causing the fluid to travel with an intermittent and ever-decreasing velocity of an ascending current, the greatest amount of settling-surface possible being offered by the apparatus to the fluid for the settlement of the suspended matter, eddies being formed by the passing liquid favorable for such deposition throughout nearly the whole of the apparatus. The effect of such eddies is that a large amount of the flow of the liquid is retained in a dormant condition, which allows the suspended matter to deposit with the least possible disturbance or hinderance. The direction of the ascending current is indicated by arrows in Fig. 1. The water or other liquid entering by the side apertures $h$ passes to the central aperture $h'$ of the upper diaphragm around the extended nozzle of the upper cone, hence turning again to the outside of the vessel to ascend through the side apertures $h$ of the second coned diaphragm, and so on.

In Fig. 6 an equivalent modification is shown with reversed diaphragms. The coned vessel $g$ may be used alone without the containing-vessel G. The liquid ascends through the orifice $h$ at the circumference of the transverse diaphragms through the nozzle of the cone and then passes to the periphery of the next diaphragm to pass through the successive range of holes or openings $h$ therein, and so on, eddies being formed in the center of the coned diaphragms and toward the peripheries. All the diaphragms employed within the coned chambers are merely pressed therein, making a sufficient joint by means of india-rubber or other packing around their peripheries, and can be thus all readily lifted from the coned chamber for examination or cleansing when required. The duplication of the separating or settling chambers G and $g$ give great facilities for the settlement of the larger and heavier solid matter in the outer chamber before the ascending current passes upward through the inner chamber to effect the separation or settlement of the finer matter.

Should the separation effected in the single duplicate chambers G and $g$, as shown, not be sufficient, I may use any further settling or separating chamber as may be found desirable; or should extreme purity of the effluent fluid be desired I may pass it through a filter or filters of any well-known and effective type.

Having now particularly described and ascertained the nature of my said invention and in what manner the same is to be performed, I declare that what I claim is—

1. An apparatus consisting of the combination of an automatic feed apparatus, a powder for proportionally treating a liquid with an agitating-vessel containing readily-removable coned diaphragms for producing agitation, and a settling or separating vessel provided with coned and perforated readily-removable diaphrams in which separation and settlement are effected in the ascending stream of liquid, substantially as described.

2. In the herein-described apparatus, a proportional feed comprising a water-wheel driven by the liquid to be treated, an agitating apparatus for discharging suitable purifying-powder into said liquid, and connections between the water-wheel and agitator for actuating the latter.

3. In the herein-described apparatus, the combination of an exterior cylindrical case, and an internal pendent coned chamber provided with suitable diaphragms, and means for giving to the liquid the desired circulation.

In testimony whereof I have signed my name to this specification in the presence of two subscribing witnesses.

PROSPER AUGUSTE MAIGNEN.

Witnesses:
R. J. PRESTON,
J. L. RATHBONE.